United States Patent
De Bougrenet et al.

(10) Patent No.: US 12,235,441 B2
(45) Date of Patent: Feb. 25, 2025

(54) CONTACT LENS FOR AUTOMATICALLY AIMING IN THE DIRECTION OF AN EYE OF A PERSON, ASSOCIATED DETECTION SYSTEM

(71) Applicant: INSTITUT MINES TELECOM, Palaiseau (FR)

(72) Inventors: Jean-Louis De Bougrenet, Guilers (FR); Vincent Nourrit, Brest (FR); Cyril Lahuec, Lampaul Plouarzel (FR); Fabrice Seguin, Morlaix (FR); Francesco Ferranti, Brest (FR); Thierry Djenizian, Auriol (FR)

(73) Assignee: INSTITUT MINES TELECOM, Palaiseau (FR)

( * ) Notice: Subject to any disclaimer, the term of this patent is extended or adjusted under 35 U.S.C. 154(b) by 590 days.

(21) Appl. No.: 17/602,973

(22) PCT Filed: Apr. 15, 2020

(86) PCT No.: PCT/EP2020/060541
§ 371 (c)(1),
(2) Date: Oct. 11, 2021

(87) PCT Pub. No.: WO2020/212394
PCT Pub. Date: Oct. 22, 2020

(65) Prior Publication Data
US 2022/0197030 A1 Jun. 23, 2022

(30) Foreign Application Priority Data
Apr. 15, 2019 (FR) ...................... 1903979

(51) Int. Cl.
*G02B 27/00* (2006.01)
*G02B 27/01* (2006.01)
*G02C 7/04* (2006.01)

(52) U.S. Cl.
CPC ....... *G02B 27/0093* (2013.01); *G02B 27/017* (2013.01); *G02C 7/04* (2013.01)

(58) Field of Classification Search
None
See application file for complete search history.

(56) References Cited

U.S. PATENT DOCUMENTS

| 5,345,281 A | 9/1994 | Taboada et al. |
| 8,446,341 B2 * | 5/2013 | Amirparviz .......... A61B 5/6821 250/221 |

(Continued)

OTHER PUBLICATIONS

International Search Report corresponding to International Application No. PCT/EP2020/060541 dated Jun. 26, 2020, 7 pages.

(Continued)

*Primary Examiner* — Darryl J Collins
(74) *Attorney, Agent, or Firm* — Ronald M. Kachmarik; Cooper Legal Group LLC

(57) ABSTRACT

A contact lens, intended to be worn on the eye of a person, for automatically aiming in the direction of the eye. The contact lens includes:—a membrane suitable for covering the pupil and the iris of the eye;—at least two light sources encapsulated in the membrane, each suitable for emitting a light beam whose divergence is controlled in relation to the axis of the lens;—at least one interface for collecting and supplying electrical energy to the light sources, from outside the lens;—at least one electronic circuit suitable for activating the sources from the interface.

18 Claims, 4 Drawing Sheets

(56) References Cited

U.S. PATENT DOCUMENTS

| | | | |
|---|---|---|---|
| 10,775,616 B1* | 9/2020 | Ouderkirk | H01L 25/0753 |
| 2017/0337706 A1 | 11/2017 | Marsh et al. | |
| 2017/0371184 A1 | 12/2017 | Shtukater | |
| 2018/0104921 A1* | 4/2018 | Beyad | H01M 10/049 |
| 2018/0167393 A1 | 6/2018 | Walrant | |
| 2018/0252944 A1* | 9/2018 | Pugh | G02C 7/101 |
| 2019/0033618 A1 | 1/2019 | Choi et al. | |

OTHER PUBLICATIONS

Gerda Buchberger, et al., "Transparent, flexible, thin sensor surfaces for passive light-point localization based on two functional polymers", Sensors and Actuators A: Physical, Elsevier BV, NL, vol. 239, Jan. 13, 2016, pp. 70-78.

N. M. Farandos et al., "Contact lens sensors in ocular diagnostics", Advanced Healthcare Materials, vol. 4, No. 6, 4, pp. 792-810, Apr. 2015.

Z. Blum, D. Pankratov & S. Shleev (2014). "Powering electronic contact lenses: current achievements, challenges, and perspectives". Expert Review of Ophthalmology 9(4), pp. 269-273, 2014.

S. Cui, Y.C. Soh, "Linearity indices and linearity improvement of 2-D tetra-lateral position sensitive detector". IEEE Transactions on Electron Devices, vol. 57, pp. 2310-2316, 2010.

Electro-optics, Dec. 2018, Jan. 2019, pp. 11.

Y.-J.Kim et al., "Eyeglasses-powered, contact lens-like platform with high power transfer efficiency," Biomedical Microdevices, vol. 17, No. 4, Jul. 2015.

* cited by examiner

[Fig 1]
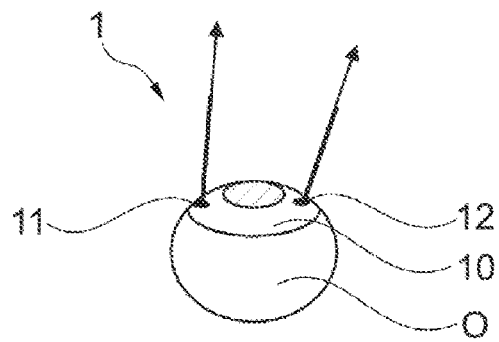
[Fig 2]
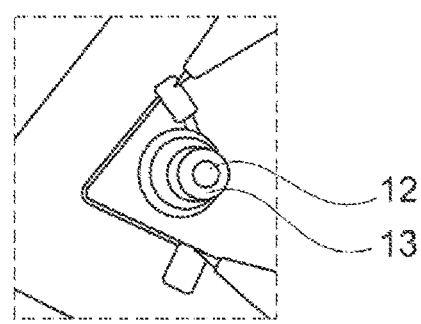
[Fig 3A]
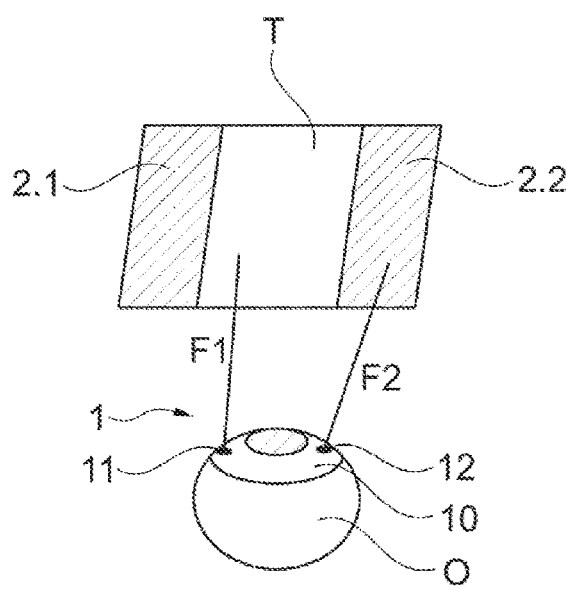

[Fig 3B]
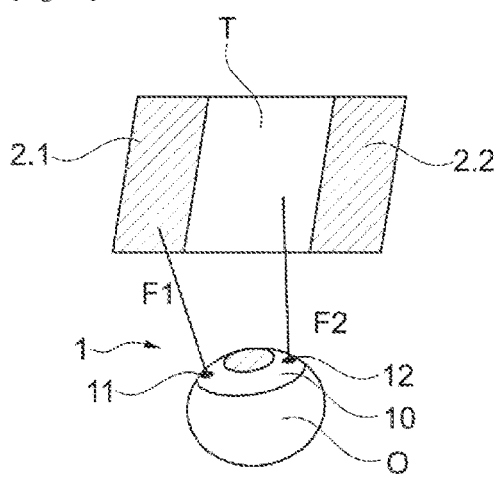
[Fig 4]
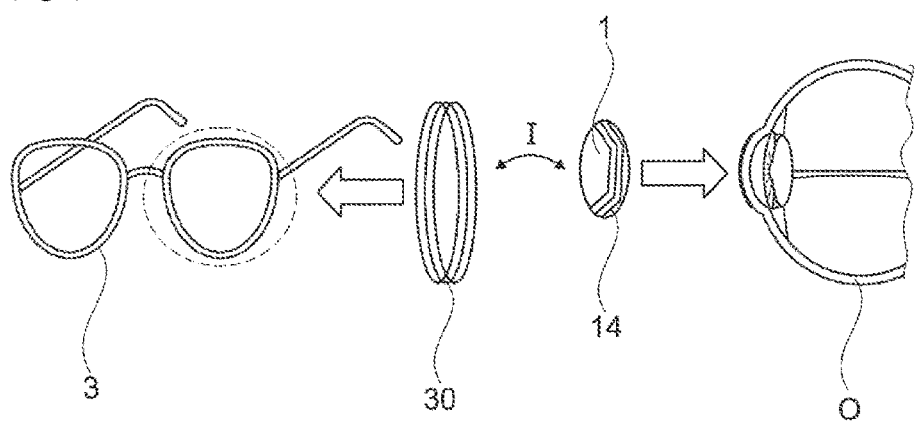

[Fig 5]
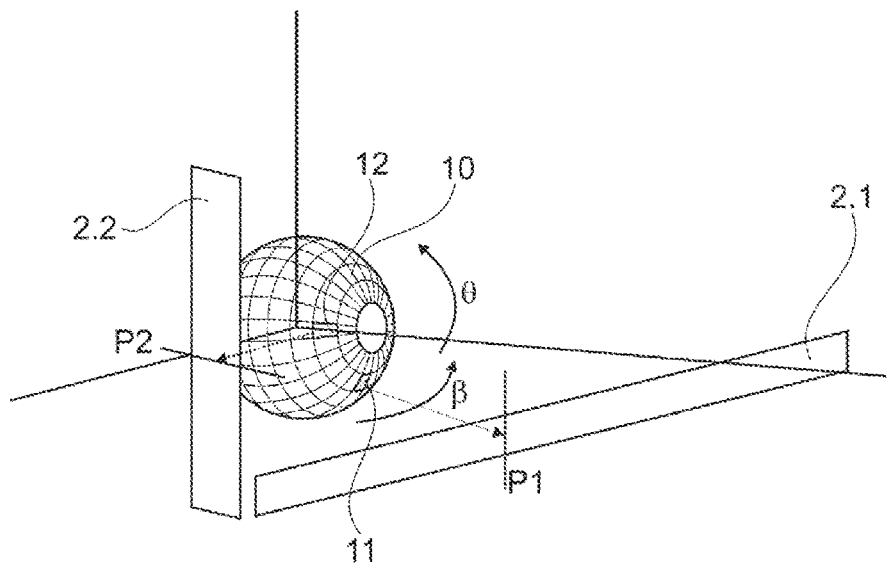
[Fig 6]
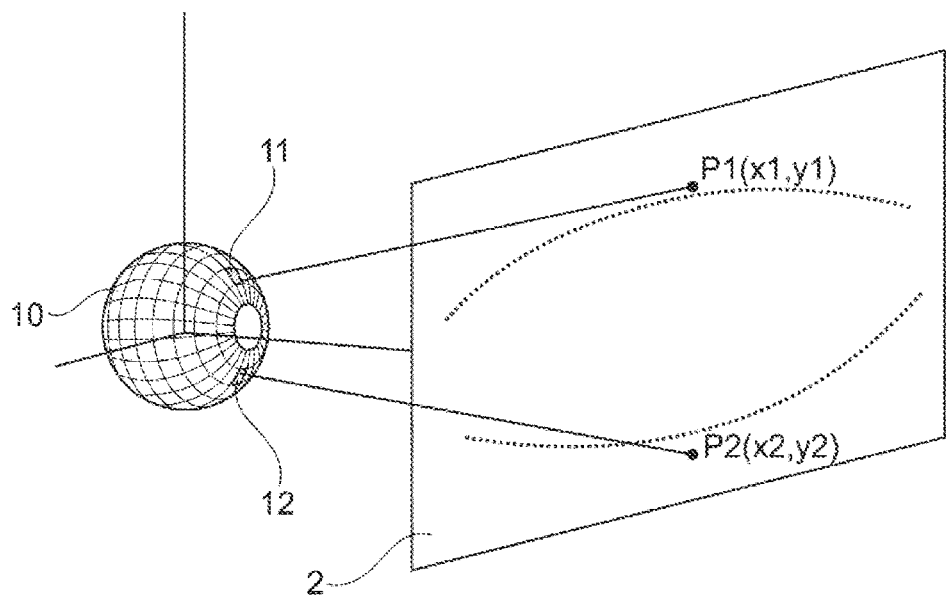

[Fig 7]
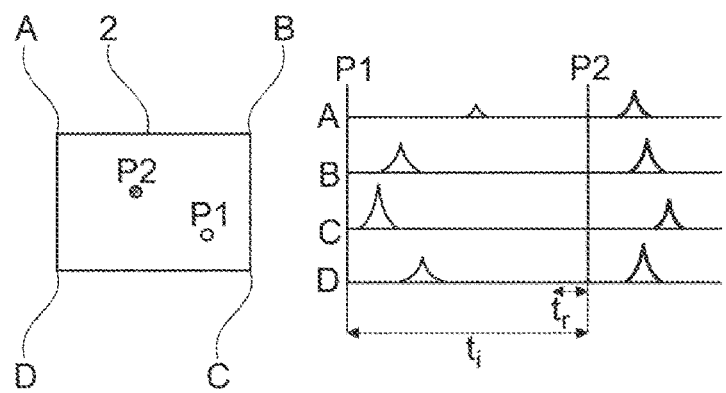
[Fig 8A]
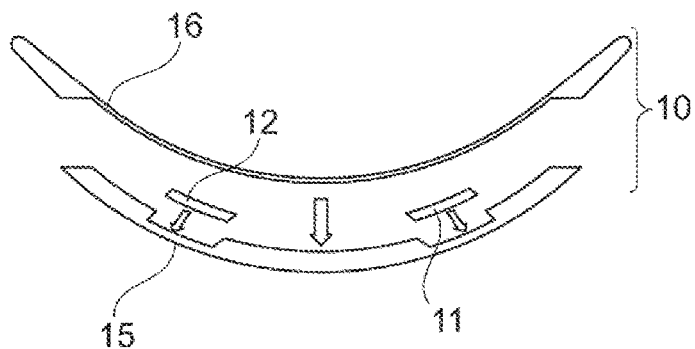
[Fig 8B]
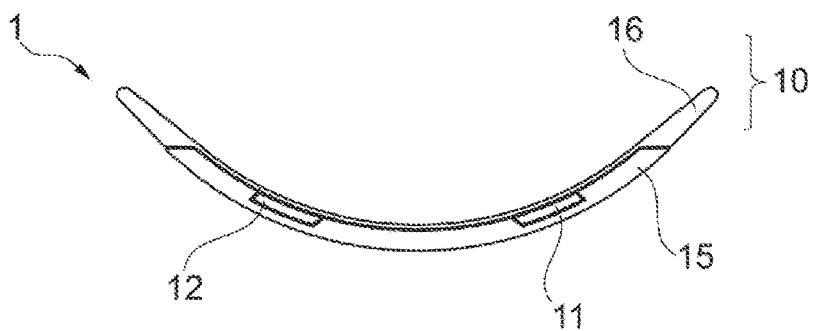

CONTACT LENS FOR AUTOMATICALLY AIMING IN THE DIRECTION OF AN EYE OF A PERSON, ASSOCIATED DETECTION SYSTEM

TECHNICAL FIELD

The present invention relates to a contact lens for automatically pointing the direction of an eye of a person and to an associated detection system.

The lens is a completely autonomous system installed on at least one eye of a person.

The invention aims in particular to automatically detect the direction of the gaze of a person.

The gaze detection device associated with the contact lens may be integrated into a frame, in particular a spectacle frame, or be integrated into an augmented or virtual reality headset or a head-up display (HUD) screen.

The applications of the present invention are numerous, among which may be cited: assistance in surgical procedures, driving assistance, human-machine interface, analysis of the subject's attention and fatigue, design of new human-machine interfaces: home automation, personal assistance (communication with patients with locked-in syndrome, for example), vision assistance for the visually impaired, etc.

PRIOR ART

Concretely representing the pointing of the direction of a person's gaze has become an essential operation when using, for example, augmented or virtual reality headsets for which it is useful to assess attention or cognitive load or to validate an operation by pointing it out by gaze: [1] and [2].

Few solutions are known: patent U.S. Pat. No. 5,345,281A and patent application US2017/371184A1 may be cited here.

However, devices for detecting the concrete representation of a light beam adapting to their shape, wavelength, or any other physical parameter characterizing them are very numerous. Patent US8446341B2 proposes one advantageous solution for pointing and automatically detecting the direction of a person's gaze, in which a contact lens is provided within which is integrated a single light-emitting diode facing the cornea and, in addition, biosensors on the periphery of the lens. The single diode and the direction detector described, and their arrangement, do indeed make it possible to visualize the position of the person's gaze but not to calculate the direction of the eye with precision. This is explained by the fact that the aim of this patent is to activate an external device (e.g. TV or other), which means that it does not require precise extraction of the direction of the gaze and in particular the point of fixation (point of vergence).

There is therefore a need to improve the pointing systems when they are used to precisely extract the direction of the gaze and of fixation involving vergence, and the related systems for automatically detecting the direction of a person's gaze, in particular by overcoming the aforementioned drawbacks.

The aim of the invention is to at least partially address this need.

DISCLOSURE OF THE INVENTION

To that end, the invention relates, under one of its aspects, to a contact lens, intended to be worn on the eye of a person, for automatically pointing the direction of the eye, comprising:

- a membrane able to cover the pupil and the iris of the eye and preferably the sclera at least partially;
- at least two light sources encapsulated in the substrate, each able to emit a light beam or cone the divergence of which is controlled with respect to the axis of the lens;
- at least one interface for collecting and supplying electrical energy to the light sources, from outside the lens;
- at least one electronic circuit able to activate the sources from the interface.

What is meant here, and in the context of the invention, by "controlled divergence" is the usual meaning, namely the fact that the divergence of a light cone or beam, in particular in the case of a laser diode, is controlled by means known to those skilled in the art. In particular, for a laser diode, this means that its beam is emitted with a very small angle of divergence.

According to one advantageous embodiment, the contact lens comprises a battery encapsulated in the membrane and connected to the interface, the battery being able to be charged from the interface and to supply electrical power to the light sources and/or the optoelectronic functions associated with the light sources, the electronic circuit being able to activate the sources from the battery.

The light sources may emit in the infrared or visible.

The light sources are preferably light-emitting diodes (LEDs) or vertical-cavity surface-emitting lasers (VCSELs), or edge-emitting laser diodes.

Preferably, the LED or VCSEL diodes are each provided with an optic for shaping their beam.

According to one advantageous variant embodiment, the interface comprises an antenna able to transfer energy by electromagnetic induction, and a rectifier connected to the antenna for transferring all or some of the energy received by the antenna to the sources and, as applicable, to the battery and/or to the other optoelectronic functions encapsulated in the membrane. The remote transfer of energy by induction, in particular with a view to charging the battery, is advantageous because it may be done easily and quickly without an external connection, by means of an antenna integrated into the support (spectacle frame, augmented reality headset) which will be used for the detection of the beams from the light sources. Preferably, the rectifier is able to transfer all or some of the energy received by induction directly to the light sources.

According to one advantageous variant, the antenna may be able to transmit data wirelessly, in particular by radiofrequency (RF).

Advantageously, at least one of the two light sources is implemented as part of a communication system.

Advantageously, the battery is a deformable accumulator, encapsulated in the membrane. It may be an accumulator as described and claimed in patent application WO 2018/167393 A1. Such an accumulator has the advantage of being very small in size, typically with a area of the order of 0.75 cm². This flexible battery also has the advantageous characteristics of being stretchable and self-repairing so as to be best integrated into the contact lens and to be able to provide sufficient autonomy for the operation of the light sources.

The contact lens is preferably a hard or hybrid (semi-hard) scleral lens. A scleral lens has the advantage of being more stable on the eye than a conventional contact lens, which is advantageous for such a device installed on the eye. A scleral lens offers a larger useful area. Another subject of the invention is an automatic system for detecting the direction of the gaze of a person comprising at least one contact lens as described above. It is therefore a system that will automatically detect, i.e. once programmed without human intervention, the direction of a person's gaze.

Preferably, the system comprises two contact lenses described above, one being dedicated to the right eye, the other to the left eye of the person.

According to a first advantageous embodiment, the system operates without any element other than the concrete representation in space of the beams generated by the light sources of the contact lens, which concretely represent the direction of the gaze in space.

According to a second advantageous embodiment, the contact lens is coupled to a position-sensitive detector (PSD) arranged facing the eye, which allows the extraction of the angle of deviation with respect to the normal of the gaze.

Thus, according to this second embodiment, the system further comprises:
- a support, intended to be positioned in a fixed manner with respect to the person's face;
- at least one position-sensitive detector (PSD), secured to the support, the one or more detectors being able to detect the position of the one or more beams from the at least two light sources of the contact lens so as to extract therefrom the angle of deviation with respect to the normal of the gaze.

Instead of a PSD, a camera may be used to like effect. The advantage of implementing a PSD is that it is simpler, less expensive and more precise.

The support for the PSD may be a frame, intended to be worn on the person's face, such as a spectacle frame or an augmented reality headset or a head-up display (HUD) screen.

According to a first variant, the system comprises a single PSD detector, intended to be arranged facing the eye, the PSD detector being transparent in the visible and sensitive in the near-infrared (PIR), the light sources of the contact lens emitting in the near-infrared.

According to a second variant, the system comprises two PSD detectors, intended to be arranged at the periphery of the eye, substantially in a plane facing the eye, so as to cover the range of angular variation in the position of the eye, the PSD detectors being arranged so as not to obstruct the person's vision.

Thus, the invention essentially consists in installing, on a contact lens, at least two optical emission sources, each of which is monitored for the divergence of the visible or non-visible beam emanating from the contact lens so as to concretely represent the direction of the gaze, by means of one or more optical beams.

The functions required for the operation of the light sources, such as a flexible battery and its charging interface, and the electronics required for operation, are integrated into the contact lens.

The contact lens may implement the detection of the direction of the gaze in space by itself, i.e. there is no need for another component for concretely representing in space the beams generated by the optical sources of the contact lens.

Alternatively, in the case where detection of the beams is useful, it is envisaged to arrange, in front of the eye, using for example the support of a spectacle frame or of an augmented reality headset, at least one position-sensitive detector (PSD) sensitive to the position of the beams, which allows the extraction of the angle of inclination of the eye with respect to these spectacles or this headset and therefore with respect to the normal of the gaze. Reference may be made to publication [3] for operation of a PSD.

The system may operate as an identification and pointing system for a remote control, where the remote control is, according to the invention, replaced directly with a person's eye equipped with the contact lens incorporating the directional light sources.

The choice of material for the one or more PSD detectors depends on the chosen wavelength and whether it is desired to implement light sources with emission in the visible or not.

In the case where it is desired not to make the light beams visible, but still to be able to detect it, the choice of the PSD, when it is arranged in front of the eye, will dictate transparency in the visible [4]. However, this choice dictates absorption in the near-infrared, which entails optimizing the material of the PSD accordingly.

Another solution for detection by PSD consists in arranging the photosensitive region on the periphery of the optical axis left free.

Unlike the contact lens according to patent U.S. Pat. No. 8,446,341B2, which only makes it possible to visualize the position of the gaze, the solution according to the invention makes it possible to calculate it. Specifically, with a PSD detector close to the eye in order to minimize its size and which does not obstruct the view of the person wearing the contact lens, it is possible to apply a calculation method allowing good precision over a wide angular range despite the eccentric emitters (sources of the lens) with respect to the optical axis. Other advantages and features of the invention will become more clearly apparent from reading the detailed description of exemplary implementations of the invention, given by way of non-limiting illustration with reference to the following figures.

BRIEF DESCRIPTION OF THE DRAWINGS

FIG. 1 is a schematic perspective view of an exemplary contact lens according to the invention placed on an eye.

FIG. 2 is a photographic reproduction of a deformable battery encapsulated in a substrate of the type of that of a contact lens according to the invention and surmounted by a light-emitting diode.

FIG. 3A is one view illustrating one configuration for detecting the light beams emanating from a contact lens according to the invention which illuminate PSD detectors arranged at the periphery of a transparent region facing the region of the iris of a person's eye.

FIG. 3B is another view illustrating one configuration for detecting the light beams emanating from a contact lens according to the invention which illuminate PSD detectors arranged at the periphery of a transparent region facing the region of the iris of a person's eye.

FIG. 4 is an overview showing the operation of an electromagnetic induction charging device allowing the charging of the deformable battery encapsulated in a contact lens according to the invention.

FIG. 5 is a schematic representation of a first configuration for detecting the light beams emanating from a contact lens according to the invention.

FIG. 6 is a schematic representation of a second configuration for detecting the light beams emanating from a contact lens according to the invention.

FIG. 7 shows the principle of position detection by measuring the photocurrents resulting from the illumination of a PSD detector.

FIG. 8A schematically illustrates a step in producing a contact lens according to the invention.

FIG. 8B schematically illustrates a contact lens according to the invention produced via the preceding step.

DETAILED DESCRIPTION

For the sake of clarity, the same elements are denoted by the same reference numerals in the various figures.

FIG. 1 shows a contact lens 1 worn by a person's eye (O) near the rim of a frame.

The contact lens 1, preferably a hard or hybrid scleral lens, bears, via encapsulation in its membrane 10, two light sources 11, 12.

These sources may be light-emitting diodes (LEDs) or vertical-cavity surface-emitting lasers (VCSELs), or edge-emitting laser diodes. The light emitted in the infrared by these sources 11, 12 may be coherent (VCSEL) or weakly coherent (LED).

When the contact lens 1 is worn by the person's eye (O), each light source 11, 12 may emit a light cone or beam F1, F2 intended or otherwise to illuminate a region of a position-sensitive detector, as described in detail below.

A shape of the sources 11, 12, such as for example diodes of elliptical shape or the installation of a shaping optic on each of the sources, may be envisaged so that each light beam is in the shape of a narrow optical beam in the detection region as described below.

As shown in FIG. 2 in relation to an orange LED 12, the contact lens 1 incorporates, within its membrane 10, a rechargeable autonomous battery which supplies the LED 12 with power.

This battery is advantageously a deformable accumulator as described and claimed in patent application WO 2018/167393 A1.

The light beams emitted by the sources 11, 12 may be detected by the contact lens 1 by itself, which makes it possible to detect the direction of the gaze in space.

Alternatively, in the case where detection of the beams is useful, it is possible to implement an external detection device comprising one or more position-sensitive detectors (PSDs) sensitive to the position of the beams, which allows the extraction of the angle of inclination of the eye with respect to these spectacles or this headset and therefore with respect to the normal of the gaze.

FIGS. 3A and 3B show configurations where two PSD detectors 2.1, 2.2 are arranged on either side of a transparent region T facing the iris of the eye. In the case of FIG. 3A, the beam F1 from the source 11 illuminates the transparent region while the beam F2 from the source 12 illuminates the sensitive detection region 2.2. In the case of FIG. 3B, the beam F1 from the source 11 illuminates the sensitive detection region 2.1, while the beam F2 from the source 12 illuminates the transparent region T.

The one or more PSD detectors 2, 2.1, 2.2 may be integrated into the support of a spectacle frame or an augmented reality headset.

The configurations of FIGS. 3A, 3B show the integration of two detectors 2.1, 2.2 into a support, such as an augmented reality headset, requiring a transparent region T facing the direction of the gaze.

For charging the flexible battery 13 integrated into the contact lens, a magnetic induction charging system is advantageously provided. Thus, preferably, an antenna in the form of an induction coil 14, with a rectifier connected thereto, are encapsulated in a contact lens 1.

One advantageous exemplary charging system is shown in FIG. 4: an induction antenna 30 is integrated into a spectacle frame 3, which preferably bears the PSD detectors.

The antenna 30 transfers energy through magnetic coupling to the antenna 14 of the contact lens 1 which may be in place on a person's eye (O) during charging by magnetic induction. Reference may be made to publication [6] for further details.

For the actual detection, two configurations are possible.

According to a first configuration (FIG. 5), two PSD detectors 2.1, 2.2 are placed in front of the eye. One favored arrangement makes provision for the detector 2.1 to be in a lower location with respect to the contact lens 1, while the other detector 2.2, substantially at 90° to the detector 2.1, is as close as possible to the nasal wall so as not to obstruct the vision. The beams from the two sources 11, 12 are directed respectively toward the detectors 2.1, 2.2.

If the eye rotates, each beam still intercepts the PSDs since the position P1/P2 given by the detectors 2.1, 2.2 does not change with a rotation $\theta/\beta$.

In a second configuration (FIG. 6), a single PSD detector 2 is placed in front of the eye.

The position of each beam from the two sources 11, 12 on the detector 2 makes it possible to deduce the direction of the person's gaze. Since the sources 11, 12 are not oriented perpendicular to the PSD detector 2, there is a region in the center thereof, shown in dotted lines in FIG. 6, which will not be illuminated and which could be entirely empty.

The operation of a PSD detector 2 is shown in FIG. 7: each of the positions P1, P2 of the beams emitted by the two sources 11, 12 is translated into photocurrents which may easily be measured, as explained in publication [3].

FIGS. 8A and 8B illustrate certain steps in a process for producing a contact lens according to the invention, of scleral type.

The membrane 10 consists here of two films 15, 16 made of transparent polymer, for example a hydrogel.

Each of the two films 15, 16 is first of all shaped as usual.

Next, all of the electronics, with the possible exception of the antenna for collecting energy by induction, are placed on the inner face of the outer film 15.

Thus, the electronics, including the light sources 11, 12, are perfectly positioned within the film 16.

Once this positioning has been carried out, the two films 15, 16 made of transparent polymer are sealed together, using UV glue for example.

Thus, all of the electronic or optoelectronic components are perfectly positioned and encapsulated between the two films 15, 16.

Of course, the invention is not limited to the exemplary implementations that have just been described.

Other variants and improvements may be envisaged without departing from the scope of the invention.

For example, the device for detecting the beams from the sources emitted from the contact lens may be integrated into any type of fixed support and preferably into a frame, for example an augmented reality headset or into a head-up (HUD) display screen.

Other variants and improvements may be made without departing from the scope of the invention.

The invention is not limited to the examples that have just been described; in particular, features of the illustrated examples may be combined with one another within variants which are not illustrated.

LIST OF CITED DOCUMENTS

1: N. M. Farandos et al., "*Contact lens sensors in ocular diagnostics*", Advanced Healthcare Materials, vol. 4, no. 6, 4, pp. 792-810, April 2015.

2: Z. Blum, D. Pankratov & S. Shleev (2014). "*Powering electronic contact lenses: current achievements, challenges, and perspectives*". Expert Review of Ophthalmology 9(4).

3: S. Cui, Y. C. Soh, "*Linearity indices and linearity improvement of 2-D tetra-lateral position sensitive detector*". IEEE Transactions on Electron Devices, Vol. 57, pp. 2310-2316, 2010.

4: G. Buchberger et al., "*Transparent, flexible, thin sensor surfaces for passive light-point localization based on two functional polymers*", Sensors and Actuators A: Physical, A239, pp. 70-78, 2016.

5: Electro-optics, December 2018, January 2019, pp. 11.

6: Y. -J. Kim et al., "*Eyeglasses-powered, contact lens-like platform with high power transfer efficiency,*" Biomedical Microdevices, vol. 17, no. 4, July 2015.

The invention claimed is:

1. An automatic system for detecting the direction of the gaze of a person comprising:
   at least one contact lens, intended to be worn on the eye of a person, for automatically pointing the direction of the eye, comprising:
      a membrane able to cover the pupil and the iris of the eye at least partially;
      at least two light sources encapsulated in the membrane, each able to emit a light beam or cone the divergence of which is controlled with respect to the axis of the lens;
      at least one interface for collecting and supplying electrical energy to the light sources, from outside the lens;
      at least one electronic circuit able to activate the sources from the interface;
   a support, intended to be positioned in a fixed manner with respect to the person's face;
   at least one position-sensitive detector (PSD) or a camera, secured to the support, the one or more detectors or the camera being able to detect the position of the beams from the at least two light sources of the contact lens so as to extract therefrom the angle of deviation with respect to the normal of the gaze.

2. The automatic system as claimed in claim 1, wherein the support is a frame, intended to be worn on the person's face.

3. The automatic system as claimed in claim 2, wherein the frame is a spectacle frame or an augmented reality headset or a head-up display (HUD) screen.

4. The automatic system as claimed in claim 1, comprising a single PSD detector, intended to be arranged facing the eye, the PSD detector being transparent in the visible and sensitive in the near-infrared (PIR), the light sources of the contact lens emitting in the near-infrared.

5. The automatic system as claimed in claim 1, comprising two PSD detectors, intended to be arranged at the periphery of the eye, substantially in a plane facing the eye, so as to cover the range of angular variation in the position of the eye, the PSD detectors being arranged so as not to obstruct the person's vision.

6. The automatic system as claimed in claim 1, the contact lens, comprising a battery encapsulated in the membrane and connected to the interface, the battery being able to be charged from the interface and to supply electrical power to the light sources and/or to optoelectronic functions associated with the light sources, the electronic circuit being able to activate the sources from the battery.

7. The automatic system as claimed in claim 6, wherein the battery is a deformable accumulator, encapsulated in the membrane.

8. The automatic system as claimed in claim 1, wherein the membrane is able to cover the sclera of the eye.

9. The automatic system as claimed in claim 1, wherein the light sources emit in the infrared or the visible.

10. The automatic system as claimed in claim 1, wherein the light sources are light-emitting diodes (LEDs) or vertical-cavity surface-emitting lasers (VCSELs); or edge-emitting laser diodes.

11. The automatic system as claimed in claim 10, wherein the LEDs or VCSELs each with an optic for shaping their beam.

12. The automatic system as claimed in claim 1, wherein the interface comprises an antenna able to transfer energy by electromagnetic induction, and a rectifier connected to the antenna for transferring all or some of the energy received by the antenna to the sources.

13. The automatic system as claimed in claim 12, wherein the rectifier is able to transfer all or some of the energy received by induction directly to the light sources.

14. The automatic system as claimed in claim 12, wherein the antenna is able to transmit data wirelessly.

15. The automatic system as claimed in claim 1, wherein at least one of the two light sources is implemented as part of a communication system.

16. The automatic system as claimed in claim 1, wherein the membrane consists of two films made of transparent polymer sealed together, one of the films bearing, before sealing, the light sources, at least part of the interface and the electronic circuit.

17. The automatic system as claimed in claim 1, which is a hard or hybrid scleral lens.

18. The automatic system as claimed in claim 1, comprising two contact lenses, one being dedicated to the right eye, the other to the left eye of the person.

* * * * *